June 28, 1966  R. L. WINBLADE ETAL  3,258,582
ENERGY MANAGEMENT SYSTEM FOR GLIDER TYPE VEHICLE
Filed July 24, 1962  7 Sheets-Sheet 4

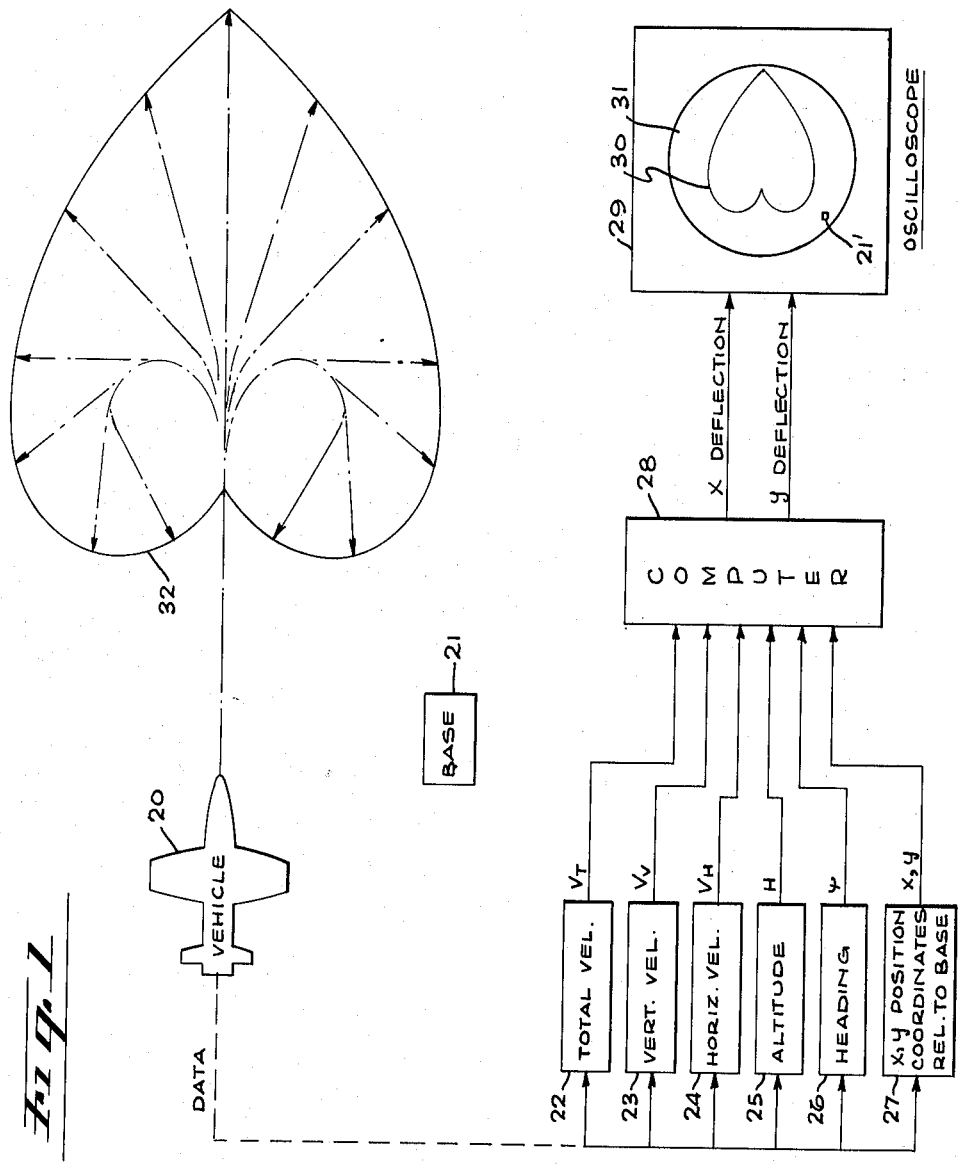

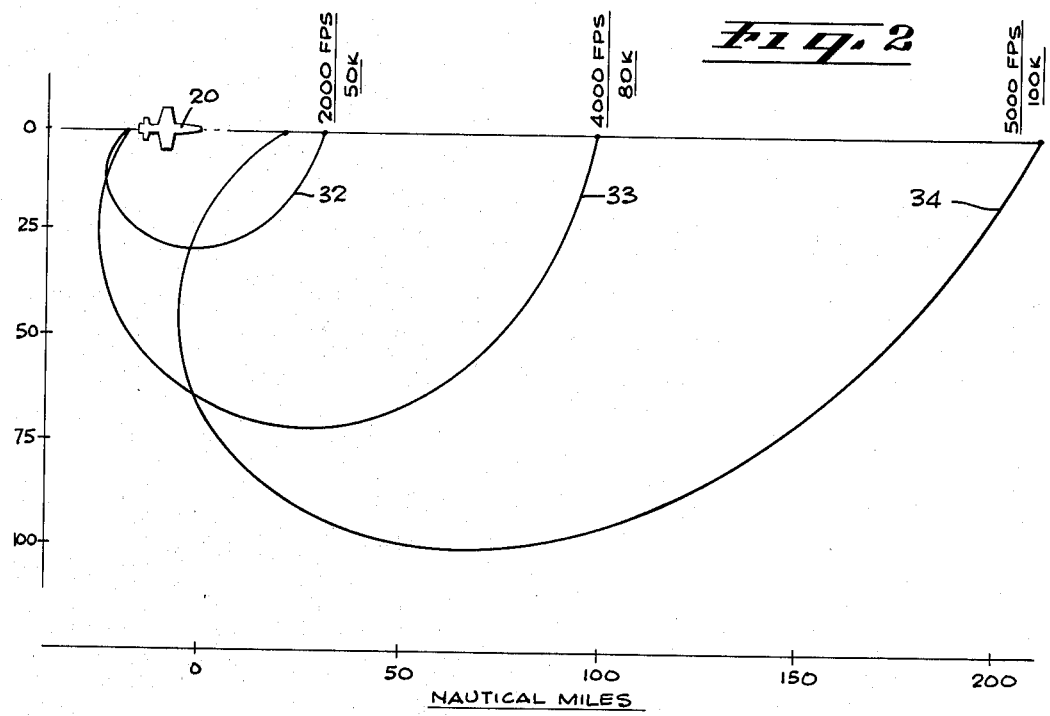
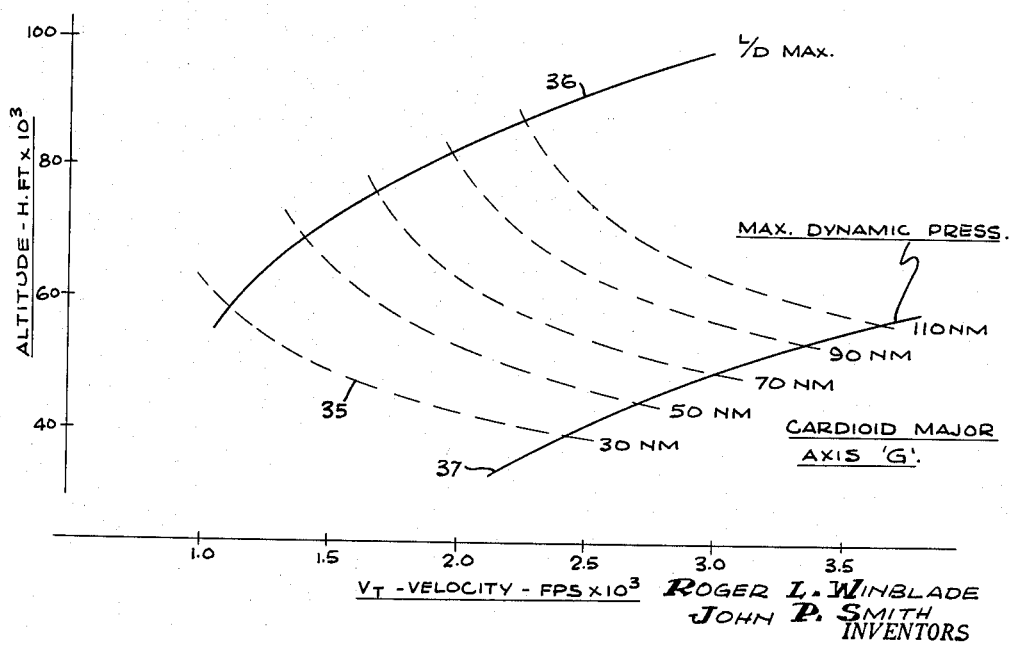

ROGER L. WINBLADE
JOHN P. SMITH
INVENTORS

BY
ATTORNEYS

ROGER L. WINBLADE
JOHN P. SMITH
INVENTORS

BY
ATTORNEYS

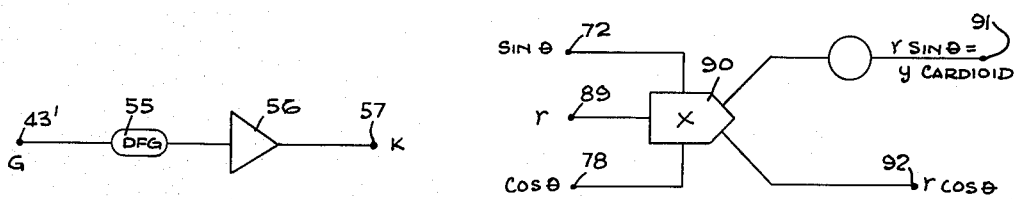
Fig. 10
Fig. 13
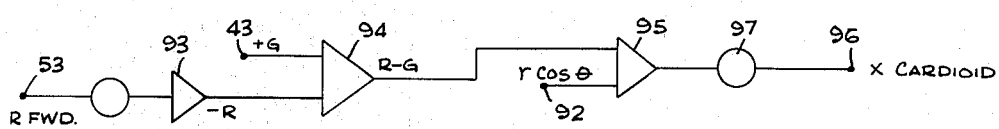
Fig. 14
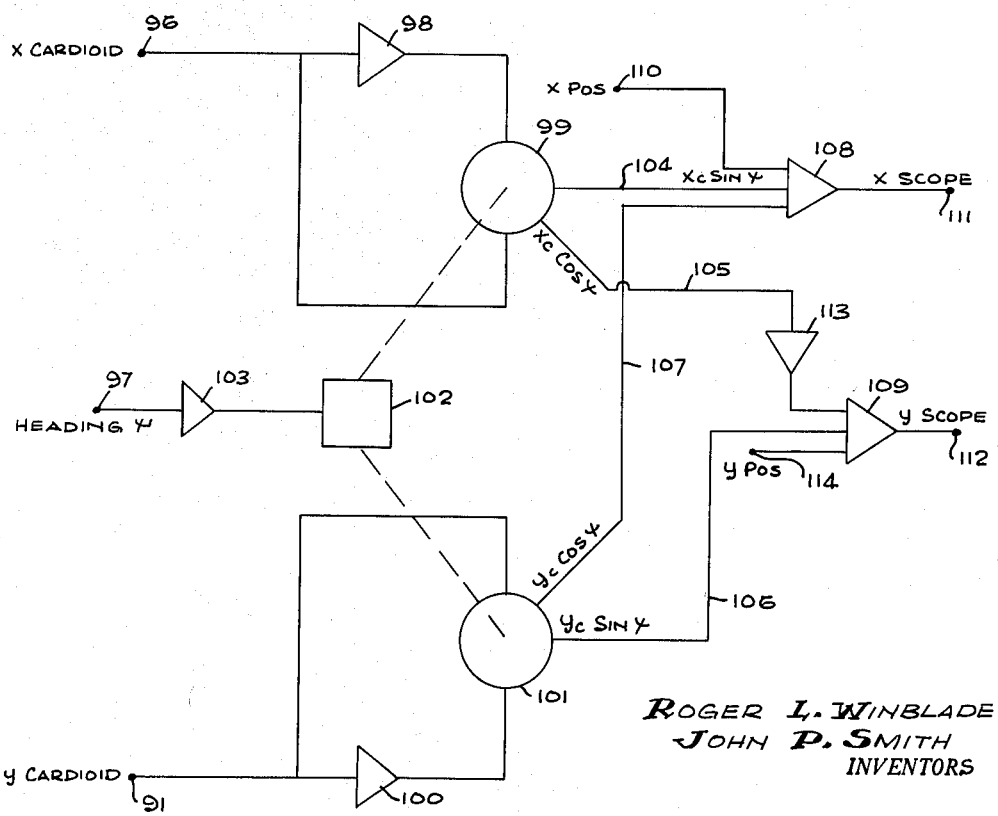
Fig. 15
ROGER L. WINBLADE
JOHN P. SMITH
INVENTORS

ROGER L. WINBLADE
JOHN P. SMITH
INVENTORS

ATTORNEYS

United States Patent Office 3,258,582
Patented June 28, 1966

3,258,582
ENERGY MANAGEMENT SYSTEM FOR GLIDER TYPE VEHICLE
Roger L. Winblade, Little Rock, and John P. Smith, Lancaster, Calif., assignors to the United States of America as represented by the Administrator of the National Aeronautics and Space Administration
Filed July 24, 1962, Ser. No. 212,173
13 Claims. (Cl. 235—150.22)

The invention described herein may be manufactured and used by or for the Government of the United States of America for governmental purposes without the payment of any royalties thereon or therefor.

This invention relates to data processing equipment including a special purpose computer. More particularly, this invention relates to such equipment which is suitable for use as terminal guidance or energy management apparatus for presenting the real time in-flight total range capability of a glider type vehicle in a graphical display which continuously affords a visual presentation of the outline of the area in which it is possible at any given instant to land the vehicle.

Hypersonic glider type vehicles such as the X-15 research aircraft presently being tested and the proposed Dyna-Soar vehicle present unusual terminal guidance problems during the ballistic or unpowered portion of their flight. The maximum distance the vehicle can glide is a function of the energy level of the vehicle, both potential and kinetic, but this energy frequently cannot be expended in such a manner as to permit the vehicle to land at a point directly beneath itself.

The X-15 vehicle will be referred to herein by way of example since the particular preferred embodiment of the apparatus to be described herein was in fact specifically developed for this vehicle for use in its flights from Edwards Air Force Base, California. With 5,000 feet per second velocity, and 100,000 feet altitude, the X-15 can glide for approximately 215 nautical miles, but the closest landing point it could successfully be maneuvered into is about 25 nautical miles ahead of it. Therefore, the aircraft could be directly over the Edwards Landing Field at maximum speed or altitude and be unable to maneuver for a landing on the dry lake used as a field. There simply is no way for the energy in the machine to be judiciously expended in maneuvering or by absorbing it in aerodynamic drag so as to permit the vehicle to land at a point directly beneath itself.

This phenomenon arises from the fact that the turning radius at high speed or at high altitude is very great and if the pilot were to try to spiral down from a high altitude and high speed condition to a point directly beneath him he would fall about 25 nautical miles short of the intended landing. This phenomenon becomes a significant problem at flight conditions typified by a velocity of approximately 3,000 feet per second at an altitude of 100,000 feet from which the airplane can just acquire the area directly beneath itself.

The display system of the present invention affords a continuous indication of the geographical landing area attainable as a function of the vehicle's location, heading, velocity, and altitude. Previous techniques utilized to accomplish the terminal guidance task have consisted of the ground controller's interpolation and evaluation of data concerning velocity, altitude and position derived from the tracking radar. These previous techniques neglect the effects of climb angle, assume a particular heading, and require excessive time to determine the range capability of the vehicle.

The previously used technique involving a ground plot of the energy is useful to the pilot only up to the point where he intercepts the "high key," usually at 20,000 feet. "High key" is one of two pre-established points in space which give the pilot a go or no-go for a dead stick landing. After this point, any information relayed from ground controllers is inapplicable and suffers from a time lag.

It is therefore an object of the present invention to provide an energy management apparatus and technique for predicting accurately whether or not a predetermined landing point is within the range of an unpowered aircraft at any given instant.

Briefly, in accordance with one aspect of the invention, this object is achieved by recognizing the empirically determined fact that, looking down from above on an assumed flat earth, the area into which the X-15 can safely be maneuvered with standard atmospheric conditions appears as a modified cardioid generally ahead of the aircraft with the valley of the cardioid closest to the aircraft. It is further noted that because of the vehicle's limited maneuverability, the area into which it can safely be landed usually lies ahead of the vehicle, and although it expands with increased speed and/or altitude, it also moves out ahead of the craft as the speed increases. In accordance with the present invention this information is displayed on the screen of an oscilloscope having a translucent ground map overlay so that there may be displayed the aircraft position relative to known ground points and the possible landing area in the form of a variable size modified cardioid traced out by the oscilloscope's electron beam and superimposed on the ground map display. Inputs of the aircraft's velocity, altitude, heading, and position are fed into a computer which generates the appropriate deflection voltages to be applied to the oscilloscope for automatically and continuously displaying the size and position of the cardioid relative to the map overlay.

Reference to the display scope permits ground controllers to assess immediately the range potential of the X-15 during all phases of flight beginning with a small cardioid, representing a small potential, at the start and progressing to a very large area cardioid well out ahead of the craft as it reaches speed and altitude, then gradually reducing to zero as the vehicle comes back to rest at a given point on the ground. Such a display is essential not only for assisting ground controllers in advising pilots, but is also intended for use as an airborne cockpit display. Such a display presents continuously to the pilot his present position, the suitable landing sites ahead, and a superimposed oscilloscope trace outlining the ground area onto which he could bring the craft for a successful landing.

The foregoing features, objects, and advantages of the invention will be more fully apparent to those skilled in the art from the following detailed description of an exemplary preferred embodiment of the invention taken in connection with the accompanying drawings wherein:

FIG. 1 is a block diagram illustrating the energy management system of the present invention.

FIG. 2 is a graphical illustration of typical range capabilities for various combinations of velocity and altitude.

FIG. 3 is a graph showing velocity as abscissa and altitude as ordinate on which the length of the cardioid major axis G is plotted for various parametric values between limiting values of lift/drag maximum ratio and maximum dynamic pressure used.

FIGS. 8 through 15 are block diagrams illustrating the circuitry of the special purpose computer used in generating the display.

Figure 4:
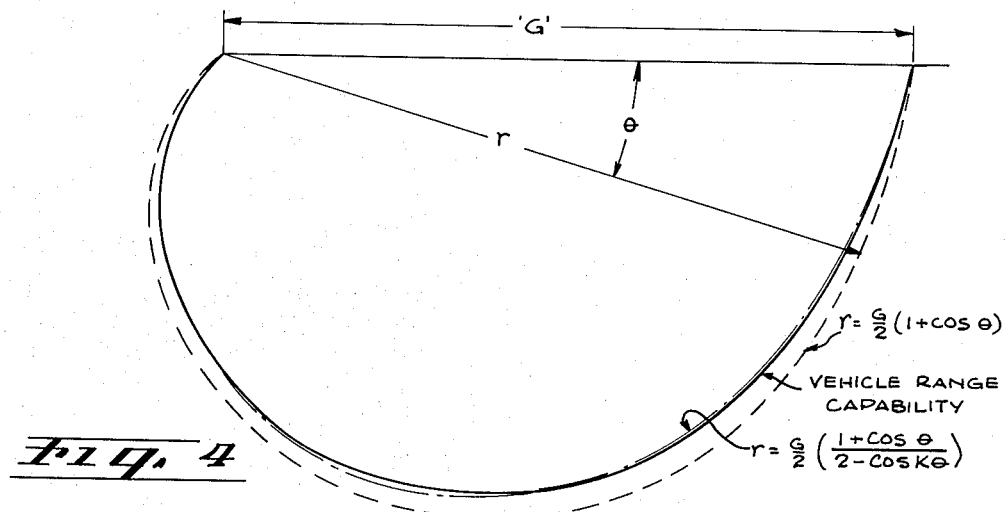
FIG. 4 is a graphical illustration of the shape of half of the cardioid illustrating the boundaries of the actual range capability, the closeness of approximation of a true cardioid, and a modified cardioid generated to produce a closer approximation.

Turning now to the drawings and in particular to FIG. 1 thereof, there is shown a block diagrammatic representation of the energy management system of the present invention. In FIG. 1 there is indicated at 20 a vehicle such as the X-15 in connection with which the system is to be used. This vehicle may be monitored from a base point 21 which may, for example, be the control tower of an airfield. This base point serves as a zero reference for coordinate systems in measurements to be made and may actually physically house the monitoring and computing equipment of the system in its ground based version.

Data concerning the energy parameters of the vehicle 20 is obtained in any convenient manner such as from radar tracking data or by telemetered information transmitted from the vehicle. This data is supplied to a plurality of information translating devices such as the devices 22, 23, 24, 25, 26 and 27.

The information translating devices may be any appropriate electronic equipment for generating from the available data concerning the various parameters an electrical signal representative of the numerical value of the parameter at a given instant to a scale consistent as between the various parameters and suitable for use as an input to the computer 28.

Where the data is acquired from radar tracking information the information translating devices may comprise simply amplifiers adjusted to the appropriate gain to provide a suitable scale factor for the computer 28 which, in the preferred embodiment described herein, is a special purpose analog computer. If data is initially available in digital form, the translators 22 through 27 would of course have to include digital-to-analog conversion equipment which may be of standard design.

In any event, it is only essential to the present invention that in whatever form the data may be and by whatever means it may be acquired there be derived a continuously varying voltage representative of the total velocity of the vehicle which appears as the output of translator 22. Similarly the outputs of translators 23 through 27 are required to be continuously varying analog voltages the magnitudes of which represent respectively the vertical component of velocity of the vehicle from translator 23, the horizontal component of velocity of the vehicle from translator 24, the altitude of the velocity vector from translator 25, the heading angle $\psi$ of the vehicle from translator 26, and the x-y position coordinates of the vehicle relative to the base 21 from translator 27.

These outputs from translators 22 through 27 are applied to the special purpose analog computer 28 which derives from them a pair of output voltages suitable for application to the $x$ and $y$ deflection channels respectively of an oscilloscope 29. The output voltages from the computer 28 are of such a character that they will deflect the beam of the oscilloscope in a pattern such that it will trace out a path 30 on the face of the oscilloscope which defines, as noted above, the area within which it is possible to land the vehicle 20 for the instantaneously given state of energy parameters as indicated by the output voltages from translators 22 through 27. As noted above this outline 30 is in fact an approximation to a cardioid which will vary in size and position in accordance with the varying energy state of the vehicle.

Superimposed over the face of the oscilloscope may be a translucent map overlay 31 which may indicate on it such reference points as the location 21' of the base 21 and the location of suitable landing areas, low level obstructions, and the like.

Inasmuch as the cardioid outline 30 is thus a true representation of the area 32 in which it is possible to land the vehicle 20 at any given instant or for any given set of energy parameters, it is thus seen that an effective real time guidance system is thereby provided.

In practice it has been found that the basic shape of the range capability is relatively constant for all energy conditions of the vehicle; however, the size and position of the cardioid with respect to the vehicle vary considerably through the range of flight conditions that are encountered.

FIG. 2 is a graphical presentation showing three possible flight conditions and the resulting range capability outlines. Data of the type shown in FIG. 2 has been experimentally obtained and plotted either from flight or simulation tests. It will be noted in FIG. 2 that the curve 32 defines the outline of the maximum range capability of the vehicle 20 when it is at an altitude of 50,000 feet with a velocity of 2,000 feet per second. The curve 33 is similar but for an altitude of 80,000 feet and a velocity of 4,000 feet per second whereas the curve 34 is drawn for an altitude of 100,000 feet and a velocity of 5,000 feet per second. It will be noted that in the relatively lower energy states represented by the curves 32 and 33 the vehicle 20 can still circle back and land beneath itself whereas in the high energy condition represented by the curve 34 this is no longer possible.

A cross plot of the type of data shown in FIG. 2 yields a series of curves similar to those shown in FIG. 3. In FIG. 3 it will be noted that the curves such as the curve 35 are parametric representations of various combinations of velocity and altitude which lead to a constant value for the cardioid major axis G. That is to say, for any combination of velocity and altitude represented by a point on the curve 35 the major axis of the cardioid will have a length of 30 nautical miles. Similar statements are true with respect to the similar parametric curves. These parametric G axis curves are drawn between limiting values determined by the curves 36 and 37 since these limiting values in practice defined the operating range of the particular vehicle for which the equipment is being designed. The curve 36 represents the parametric showing of the maximum lift over drag ratio whereas the curve 37 represents a parametric showing of the maximum dynamic pressure. The information represented in FIGS. 2 and 3 is utilized in the special purpose computer in a manner to be described in detail below.

With the change in size of the cardioid described by the variation of length of the major axis G, with velocity and altitude, the range capability can be described as illustrated in FIG. 4 in the following manner. The cardioid generated by the equation $$r = \frac{G}{2}(1 + \cos\theta)$$

closely approximates the actual range capability for any velocity and altitude combination resulting in a given value of G. FIG. 4 shows a comparison of the plot of this equation and the plot of the actual capability for a particular value of G. In FIG. 4 it will be noted that the solid line plot of half of the symmetrical cardioid indicates the actual X-15 range capability as determined from fitting a curve to experimentally measured points. The dashed line represents a true mathematical cardioid given by the equation $$r = \frac{G}{2}(1 + \cos\theta)$$

Figure 5:
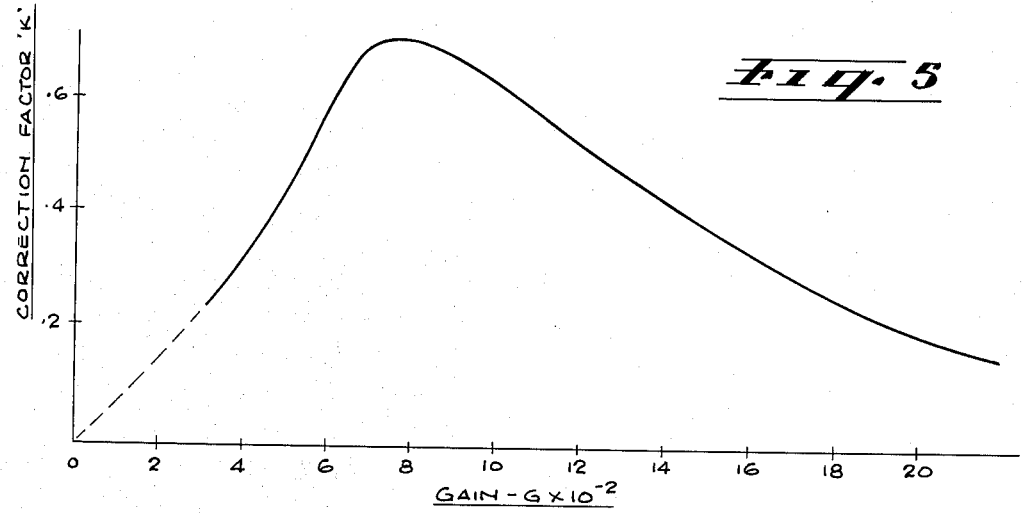
FIG. 5 is a graphical presentation of the functional relationship between two of the factors used in generating the modified cardioid display.

The discrepancy in the shape of the mathematically generated cardioid by comparison to the actual range capability can be substantially corrected by applying a factor to the cardioid equation that will cause the magnitude of the correction to vary as a function of the sweep angle $\theta$. If the original equation is multiplied by the factor $$\frac{1}{2-\cos K\theta}$$

the resulting equation, $$r = \frac{G}{2} \frac{(1+\cos \theta)}{(2-\cos K\theta)}$$

can be made to conform very closely to the proper shape by choosing the correct value of K. It should be pointed out that the modification term, $$\frac{1}{2-\cos K\theta}$$

is a special case of the general term, $$\frac{1}{2-\cos(\theta+O)}$$

where $O=F(G)\times F(\theta)$, and for the special case $F(\theta)=\theta$, and $F(G)=K-1$. An exemplary plot of this modified equation is shown in the dash-dot line of FIG. 4. By using this empirically derived modifying factor it is possible to plot values of K as a function of G to be used in the modifying factor to give the closest possible fit to actual range data. This plot of K as a function of G is shown in FIG. 5 and represents the values used in an actual preferred exemplary embodiment.

Figure 6:
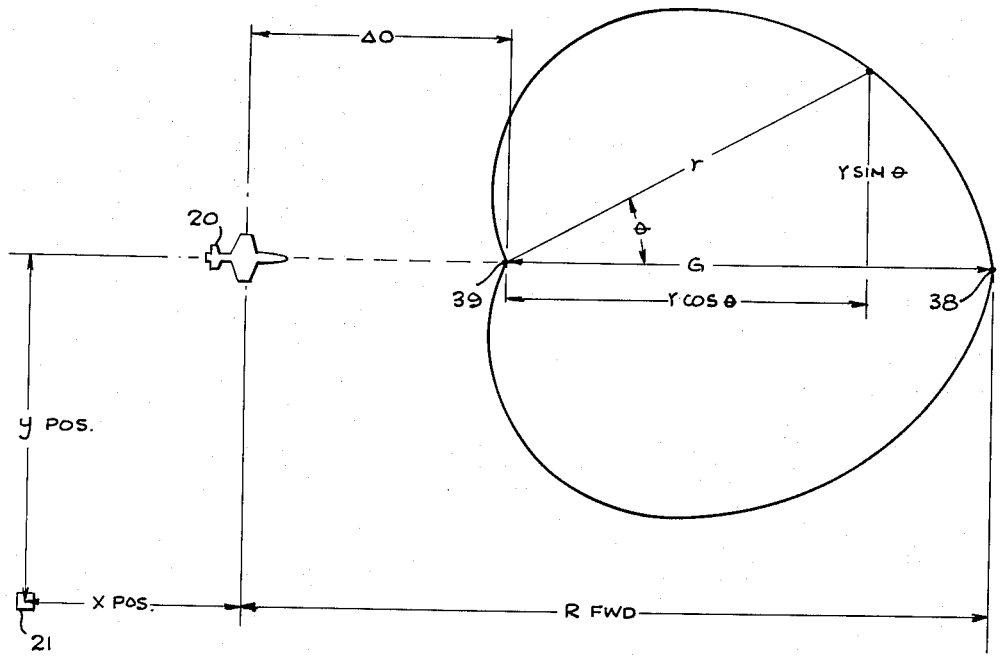
FIG. 6 is a diagramatic presentation defining certain functional terms and relationships used in generating the display.
Figure 7:
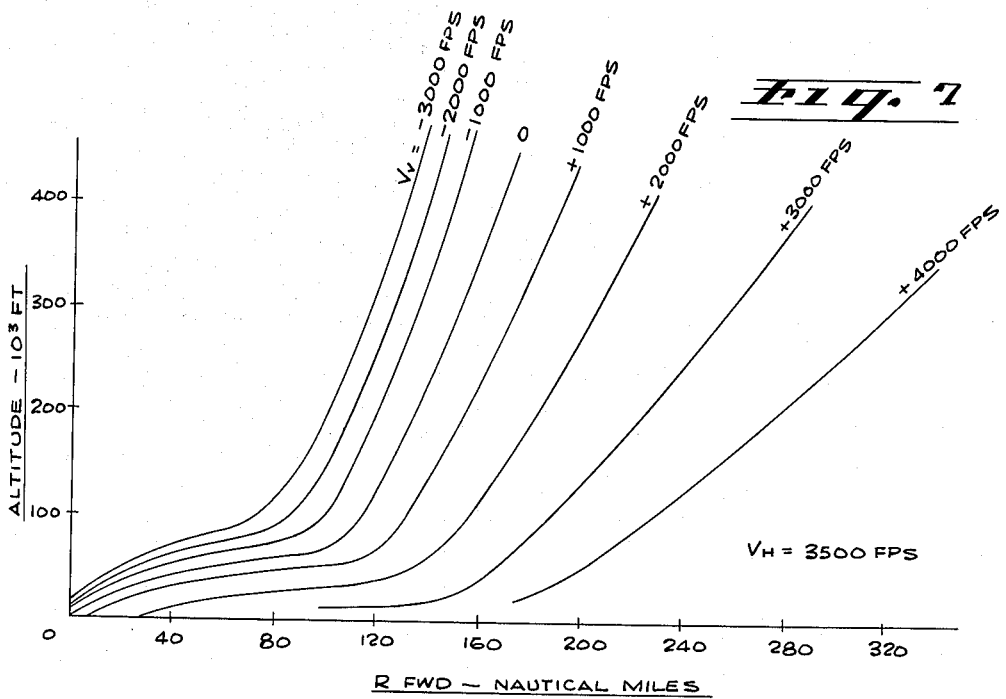
FIG. 7 is a graphical plot of the forward range of the vehicle shown as abscissa against the altitude plotted as ordinate for various parametric values of the total velocity.

As illustrated in FIG. 6, the position of the cardioid with respect to the airplane or vehicle is determined by calculating the maximum forward range R from the vehicle in a straight line straight forward direction and placing the front or apex cusp 38 of the cardioid at this point. This maximum forward range is determined from a series of curves plotted as range versus vertical velocity and altitude for particular values of horizontal velocity. FIG. 7 is a typical example of this series of plotted curves. The curves in FIG. 7 are all based on a horizontal velocity of 3,500 feet per second and are a plot of range against altitude for parametric values of vertical velocity as indicated at the ends of each curve. This empirically determined data is used by the computer in a manner to be described below.

The range information found for FIG. 6 is then summed vectorially with the geographical position coordinates $x$ and $y$ of the vehicle 20 with respect to the base 21 as illustrated in FIG. 6. It is then resolved according to the heading angle to change the coordinate system from one with origin at the vehicle 20 to one with origin at the base 21 and displayed through the overlay map on the oscilloscope to give a continuous presentation of the existing range capability of the airplane with respect to the fixed position ground map.

It will be noted from FIG. 6 that the typical situation discussed above is shown to exist wherein the valley cusp 39 of the cardioid is positioned a distance $\Delta O$ ahead of the vehicle 20. It will also be noticed that the cardioid may be viewed as being generated by a radius $r$ of varying length which sweeps through varying values of the angle $\theta$ to generate the cardioid. The projection of the radius $r$ on the major axis G is given then by the expression $r \cos \theta$ and the perpendicular distance from the major axis to the end of the radius is given by the expression $r \sin \theta$. In practice $\theta$ is taken to be zero when the radius $r$ corresponds with the major axis G and the angle $\theta$ is swept from values of minus 180° to plus 180° in a continuous manner as will be described below.

Figure 8:
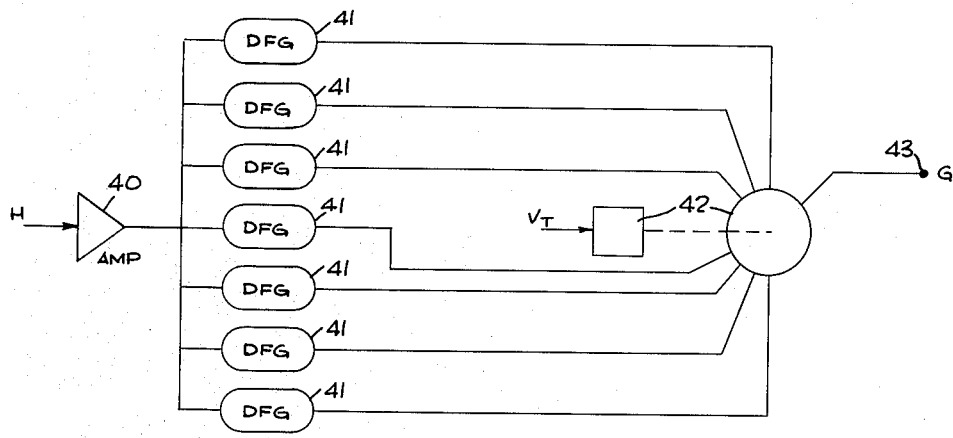

The manner in which the above discussed relationships and information is utilized by the computer 28 to produce voltages to generate the cardioid 30 is shown in greater detail in the computer circuitry illustrated in FIGS. 8 through 15. Turning now to FIG. 8 it will be seen that a voltage representative of the altitude H of the vehicle is applied to an input amplifier 40. This altitude input voltage is derived from the data translator 25 shown in FIG. 1. The output of amplifier 40 is applied to a group of parallel connected diode function generators such as 41 which serve to store the information represented in the curves of FIG. 3. These diode function generators are conventional units well known in the art and function in a manner which will immediately be apparent. A voltage representative of the total velocity as obtained from the data translator 22 is applied to the input of a servointerpolator 42. It will be noted that in FIG. 3 the curves 35 indicate values of the cardioid major axis G as functions of total velocity and altitude. When the magnitudes of these latter two quanitities are specified as by applying a voltage representative of altitude to the amplifier 40 and a voltage representative of velocity to the servointerpolator 42, the circuit shown in FIG. 8 functions to produce at its output terminal 43 a voltage representative of the magnitude of the cardioid major axis G. This of course is true because of the fact that the diode function generators 41 are designed to have transfer functions such as to store the information graphically presented in FIG. 3 in a manner well known in the art. That is to say, the design of circuitry in FIG. 8 is such that for a given applied value of the altitude the diode function generators circuits will produce a series of output voltages which are applied to the servointerpolator 42 and which represent by linear segments all values of G for a particular altitude. The particular value of G which actually appears at the output terminal 43 is then determined finally by the magnitude of the voltage representing total velocity which is applied to the servointerpolator 42 causing it to function to select one particular value from the range of values applied to it from the diode function generators.

Figure 9:
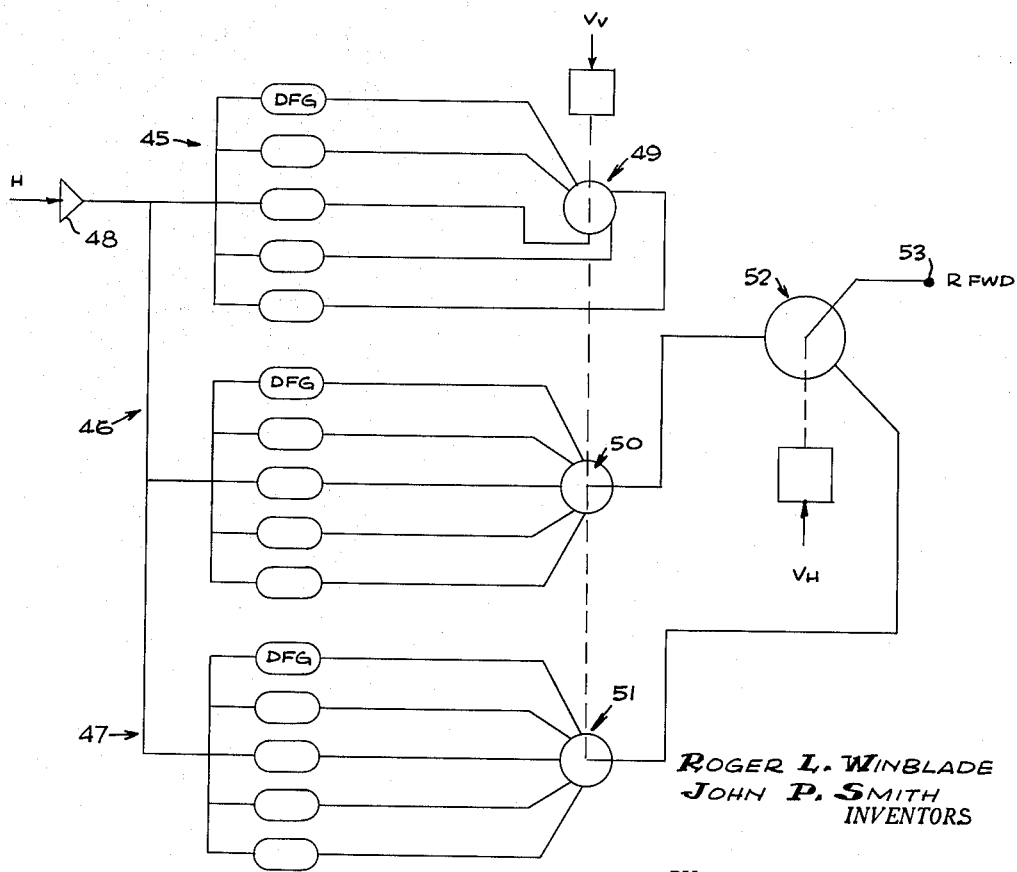

The circuitry shown in FIG. 9 is used to generate a voltage representative of the value of the forward range R as an output from the altitude input voltage using the information represented graphically in FIG. 7. The information represented in the curves of FIG. 7 is stored in a first set of diode function generators 45 for the particular value of horizontal velocity shown in FIG. 7. Two similar additional sets of curves are stored in the sets of diode function generators 46 and 47 respectively. The altitude voltage from the information translator 25 is applied through amplifier 48 to the parallel connection of the three sets of diode function generators 45, 46 and 47. Each of these sets includes five diode function generators also connected in parallel and having their outputs connected respectively to servointerpolators 49, 50 and 51. A voltage $V_v$ representing the vertical component of velocity as derived from translator 23 is applied in parallel to each of the servointerpolators 49, 50 and 51. The outputs from each of these servointerpolators 49, 50 and 51 are in turn applied as inputs to another servointerpolator 52 which has as its variable control input voltage a voltage $V_h$ applied to it and representing the horizontal component of velocity as derived from the information translator 24 of FIG. 1. It is thus seen that this circuit will produce at its output terminal 53 a voltage representative of the forward range as derived from functional relationships and information of the type displayed graphically in FIG. 7. It will be noted that the three sets of function generators 45, 46 and 47 define a linear relationshop of variation of forward range with horizontal velocity and that the actual operating point on this linear relationship is selected by the servointerpolator 52. Each of the sets of function generators 45, 46 and 47 is thus in effect providing information equivalent to one graph of the type shown in FIG. 7 and the servointerpolator 52 is making an interpolation between these graphs in a linear fashion. Within each set of function generators such as the set 45, its associated servointerpolator is generating an output voltage which is a function of the input voltage H and the input control voltage $V_v$. The output voltage R is thus a function of altitude, horizontal velocity component and vertical velocity component. Since the horizontal and vertical velocity components are utilized it is of course apparent that the attitude of the vehicle is by this method being taken into consideration.

In FIG. 10 there is shown a circuit for determining the value of the factor K used in the modifying expression for the cardioid equation as a function of the value of G, major axis of the cardioid. The value of G, it will be recalled, is a function of altitude and total velocity and is determined in the manner described above by the circuit shown in FIG. 8, the representative voltage for G appearing on terminal 43. This voltage is applied to input terminal 43′ in the circuit of FIG. 10 and is thus an input to the diode function generator 55. This diode function generator stores the information shown in the graph of FIG. 5 and thus has a transfer characteristic given by the graph of FIG. 5. The output of the function generator 55 is applied to the input of an amplifier 56 which serves as a buffer and also permits the adjustment of proper scale factors and the like. The voltage representing the correct value of K thus appears as an output of the amplifier at terminal 57.

Figure 11:
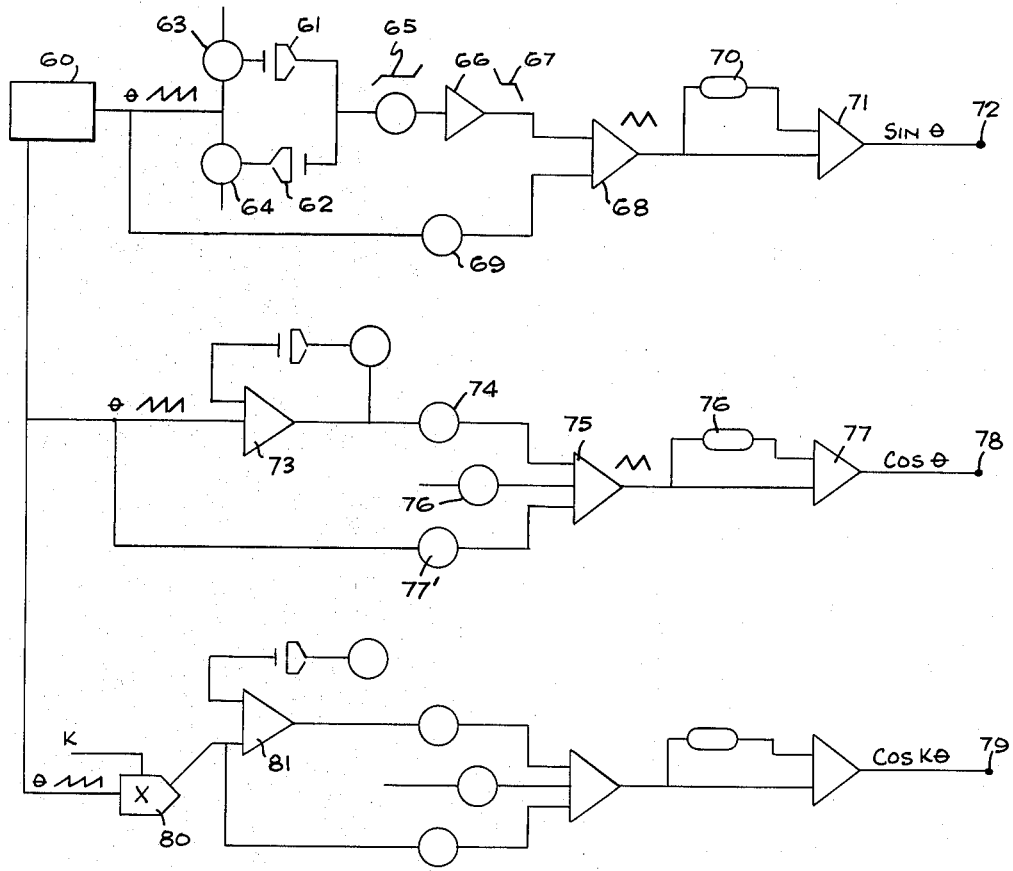

In FIG. 11 there is shown the circuitry which is used to generate values of $\sin \theta$, $\cos \theta$, and $\cos K\theta$ to be used in instrumenting the approximating equation of the cardioid and thereby generating the appropriate $x$ and $y$ deflection voltages.

A sawtooth wave generator 60 which may, for example, be of the type commonly now used in generating television and other sweep circuit rasters, is used to establish a basic timing sweep of 60 cycles per second for values of the angle $\theta$ which are swept out in order to repetitively generate the cardioid. In order to generate a voltage representing the quantity $\sin \theta$ the ouput of the sawtooth generator 60 is applied to a first branch of the circuit illustrated in FIG. 11. This first branch of the circuit comprises a pair of diodes 61 and 62 connected in reverse polarity relationship in parallel branches and leading through the potentiometers 63 and 64 to ground to form a limiting circuit to produce the wave form shown at 65. This wave form is applied through a potentiometer to amplifier 66 the gain of which is such as to increase slope of the wave form 65 by a factor of two in order to produce a wave form of the type shown at 67. The wave form 67 is then added by amplifier 68 to the sawtooth output of the generator 60 which is applied to amplifier 68 to a potentiometer 69 in order to produce a triangular wave output from the amplifier 68. This triangular wave is applied through a diode function generator 70 which stores the difference between the triangular wave and a true sine wave. An amplifier 71 is then connected to add the output of the diode function generator 70 to the triangular wave output of the amplifier 68 to thereby produce a true sine wave output at the terminal 72.

A similar technique is used in the next branch of the circuit to produce a voltage representing $\cos \theta$. In this branch the output of the sawtooth generator 60 is applied to an amplifier 73 which has a cutoff or limiting circuit connected between its output and one of its input terminals. The output of amplifier 73 is connected through a potentiometer 74 as an input to amplifier 75. Amplifier 75 also has a bias voltage applied to it through potentiometer 76 and additionally has applied to it the sawtooth wave form representing $\theta$ through potentiometer 77. As will be readily apparent to those skilled in the art this circuitry can be adjusted to also produce a triangular wave output which is 90° out of phase with the triangular wave output generated in the previous branch. The triangular wave output of amplifier 75 is applied through diode function generator 76 as an input to amplifier 77 which has as its other input the triangular wave itself. Since the diode function generator 76 is constructed to store the difference between a triangular wave and a true cosine wave, and since the amplifier adds its output to the true triangular wave output of amplifier 75, the output of amplifier 77 is a voltage appearing on terminal 78 which is representative of $\cos \theta$.

The circuitry discussed above in connection with FIG. 11 for generating voltages representing $\sin \theta$ and $\cos \theta$ is used in place of sin or cos potentiometers in order to achieve the necessary rapidity of response, accuracy, and stability of voltages. Of course it will be understood, however, that other suitable forms of sine and cosine wave generators could be used.

The sawtooth wave output of generator 60 is also applied to a third branch of the circuit shown in FIG. 11 in order to generate a voltage appearing at terminals 79 and representing the value of the expression $\cos K\theta$. It will be noted that the output of generator 60 is applied to a multiplying circuit 80. The other input to this circuit is a voltage representing the value K which voltage was identified above as being an output at terminal 57 in the circuit shown in FIG. 10. The output of the multiplier 80 is then applied to an amplifier 81 and thence through circuitry which is identical to that discussed above for generating $\cos \theta$. Since the input to amplifier 81 is $K\theta$ and since the balance of the circuit derives a cosine function, it is apparent that the output at terminal 79 will be $\cos K\theta$ as indicated in the drawing.

Figure 12:
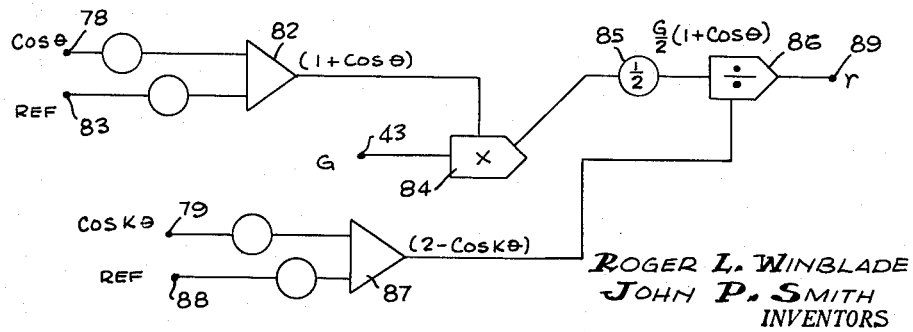

The quantities generated by the above described circuits are used as inputs to the circuit shown in FIG. 12 in order to generate the variable radius $r$ in accordance with the approximating equation earlier discussed, $$r = \frac{G}{2} \frac{(1+\cos \theta)}{(2-\cos K\theta)}$$

In FIG. 12 it will be noted that an amplifier 82 has applied to it the value of $\cos \theta$ from terminal 78 as one input and a constant reference voltage from a terminal 83 as a second input. The output of this adding amplifier is thus the expression $1+\cos \theta$. This output is applied as an input to a multiplier 84 which has also applied to it as its other input the voltage G appearing on terminal 43 in FIG. 8. The output of the multiplier 84 is applied to a potentiometer 85 which divides it by two and therefore has itself an output equal to $$\frac{G}{2}(1+\cos \theta)$$

this output is applied to an electronic division circuit 86. The divisor input to the circuit 86 is taken from amplifier 87 which has as one of its inputs the voltage $\cos K\theta$ appearing on terminal 79 in FIG. 11 and as its other input a reference voltage equivalent to $-2$ applied to terminal 88 so as to produce from the amplifier 87 (after inversion therein) an output equal to $2-\cos K\theta$. It is this output which is applied to the electronic divider 86 to thereby produce at its output terminal 89 a voltage $r$ which is the radius for the modified approximating cardioid generated in accordance with the above noted equation $$r = \frac{G}{2} \frac{(1+\cos K\theta)}{(2-\cos K\theta)}$$

The value of $r$ given at terminal 89 taken in conjunction with the values of $\theta$ is an expression in polar coordinates for generating the approximating cardioid. This expression is resolved into the Cartesian coordinates $r \cos \theta$ and $r \sin \theta$ for the cardioid shown graphically in FIG. 6 by the circuit of FIG. 13. In FIG. 13 it will be noted that the voltage $\sin \theta$ from terminal 72, the voltage $r$ from terminal 89, and the voltage $\cos \theta$ from terminal 78 are applied as inputs to an electronic multiplying circuit 90 which therefore provides as outputs the voltage $r \sin \theta$ at terminal 91 and the voltage $r \cos \theta$ at terminal 92. The voltage $r \sin \theta$ is itself directly the $y$ coordinate of the cardioid with reference to a Cartesian set of coordinates having its origin at the vehicle 20. However, the voltage $r \cos \theta$ at terminal 92 must be corrected by the amount $\Delta O$ shown in FIG. 6 in order to shift the origin of the Cartesian coordinates from the valley cusp 39 to a reference point at the vehicle 20.

This latter function is accomplished by the circuit shown in FIG. 14. In FIG. 14 the voltage from output terminal 53 in FIG. 9 which represents the forward range R is applied through a potentiometer (which merely adjusts the scale factor) to an amplifier 93. The amplifier 93 of course results in an inversion so that its output is minus R. This output is applied as one input to a summing amplifier 94. The other input to amplifier 94 is the voltage G derived from terminal 43 in FIG. 8. Since the amplifier 94 also causes an inversion its output will be the quantity R minus G, which is shown as the origin adjustment ΔO in FIG. 6. This origin adjustment ΔO is added to the voltage $r \cos \theta$ which is derived from terminal 92 in FIG. 13 by the summing amplifier 95. The output at terminal 96 is connected through potentiometer 97 to amplifier 95 is then the desired $x$ coordinate for the cardioid with reference to an origin at the vehicle 20.

In FIG. 15 there is shown the circuitry for combining the above discussed quantities as generated in the manner necessary to produce the $x$ and $y$ scope deflection voltages necessary to display the cardioid with reference to an origin located at the base point 21. In FIG. 15 it will be noted that the $x$ cardioid voltage derived by the circuit of FIG. 14 is applied at input terminal 96. A voltage derived from information translator 26 in FIG. 1 and representing the heading angle $\psi$ of the vehicle 20 is applied to input terminal 97 in FIG. 15. With reference to FIG. 6 this heading angle $\psi$ may be defined as the angle between the forward direction of the vehicle 20 and the pairs of the fixed set of coordinates having its origin at the base 21. The $y$ cardioid voltage derived in FIG. 13 and appearing at terminal 91 therein is also applied to the corresponding input terminal 91 in FIG. 15.

In the diagrammatic showing of FIG. 6 it is assumed that the heading of the vehicle 20 is such that the major axis G of the cardioid is parallel to the $x$ axis of the indicated set of Cartesian coordinates with origin at the base 21. Of course this assumption is a special case only and the major axis G which, when extended, passes through the longitudinal axis of the vehicle 20 coaxially therewith, will change its angular relationship to the $x$-$y$ axes through base 21 as the heading $\psi$ of the vehicle 20 changes. That is to say, looking at FIG. 6, the major axis G of the cardioid will change its angular orientation as the vehicle 20 changes its heading with respect to the base so that the vehicle 20 is always pointing in a straight line directly at the valley cusp point 39 and along the major axis G of the cardioid. The circuit of FIG. 15 is arranged to take the $x$ and $y$ cardioid voltages with reference to this moving set of coordinates having its origin at the vehicle 20 and transform this information into a fixed set of $x$ and $y$ coordinates having its origin at the base 21 so that appropriate oscilloscope deflection voltages can be generated to show the rotation and movement of the cardioid as the vehicle 20 changes its heading with respect to base 21.

In order to accomplish this function the $x$ cardioid voltage at terminal 96 is applied through amplifier 98 to a sine-cosine potentiometer 99. Similarly, the $y$ cardioid voltage is applied from terminal 91 through an amplifier 100 to another sine-cosine potentiometer 101. The position of the wiper arms on these potentiometers is controlled by a servomotor 102 driven from amplifier 103 to which the heading voltage has been applied from terminal 97. The voltage at terminal 97 of course represents the magnitude of the angle $\psi$ between the heading of the vehicle 20 and the $y$ axis of the system of coordinates centered at the base 21 as shown in FIG. 6.

The output of potentiometer 99 appears on leads 104 and 105. The voltage on lead 104 represents the product of the sine of $\psi$ (where $\psi$ is the heading angle) times the $x$ cardioid voltage. The voltage on lead 105 represents the $x$ cardioid voltage times $\cos \psi$. Similarly the outputs of potentiometer 101 appear on leads 106 and 107. The voltage on lead 106 represents the product of the $y$ cardioid voltage times the sine of $\psi$ whereas the voltage on lead 107 represents the $y$ cardioid voltage times the $\cos$ of $\psi$.

The $x$ deflection voltage for the oscilloscope is generated by a summing amplifier 108 which has as its inputs a voltage applied to terminal 110 representing the $x$ position of the vehicle 20 with respect to the base 21. This voltage is derived from the information translator 27 in FIG. 1. A second input is the voltage $x_c \sin \psi$ appearing on lead 104 from potentiometer 99. A third input is the voltage $y_c \cos \psi$ appearing on lead 107 from potentiometer 101. As will be apparent from a study of FIG. 6 the sum of the three input voltages to amplifier 108 produces as an output on terminal 111 a voltage which gives the $x$ coordinate of a point on the cardioid with respect to the base 21 for any heading angle of the vehicle 20.

Similarly, the three inputs to amplifier 109 comprise the $y$ position voltage of the vehicle with respect to the base which is applied to terminal 114 and which is derived from the information translator 27 in FIG. 1 as a first input. The second input is a voltage $y_c \sin \theta$ derived from potentiometer 101 over lead 106. The third input is a voltage minus $x_c \cos \theta$ derived as an output of amplifier 113 which has as its input the positive of this voltage appearing on line 105 from potentiometer 99. Similarly, the output of amplifier 109 will readily be seen to be a voltage representing the $y$ coordinate of a point on the cardioid with respect to the set of coordinates having its origin at the base 21 for any heading angle of the vehicle 20.

In practice it will thus be seen that the oscilloscope display continuously gives a visual picture not only of the outline of the area in which it is possible to land the vehicle at any given instant but also gives a picture of the true instantaneous heading of the vehicle which will lie along the major axis G of the cardioid the change of direction of which with respect to the fixed map overlay can always be observed.

It will thus be seen that the apparatus described herein affords to the observer of the oscilloscope, whether it be a ground monitor in the ground based version or whether it be the pilot in the airborne cockpit version, a continuous picture with respect to a fixed map overlay of the heading and maximum straight line forward range of the vehicle at any given instant together with a picture of the range which can be achieved by maneuvering in any direction. The area thus outlined is as noted a modified cardioid the major axis of which lies along the forward range and the lobes of which include the area which can be reached by appropriate change of heading. The observer is thus kept continuously and instantaneously informed of the range capabilities resulting from the energy state of the vehicle at any given instant. This is the information necessary for maximum guidance effectiveness.

While a preferred exemplary embodiment of the invention has been described herein it will of course be understood that various modifications and substitutions of components and the like may be made within the spirit and scope of the present invention as defined by the appended claims.

What is claimed is:
1. Vehicle flight guidance apparatus comprising:
   means for continuously computing coordinates of a closed curve approximating the outline of the area in which it is possible to glide land said vehicle at a given instant;
   electro-optical display means;
   translucent map overlay means positioned in cooperative relationship to said display means;
   and means for actuating said display means to display said approximation of said outline with referance to said map means.
2. Energy management apparatus for presenting the continuously varying real time in-flight total range capability of a glider type vehicle comprising:

means for continuously measuring the position, velocity, altitude, and heading of said vehicle;

means for computing from said measured values the coordinates of an approximation of the outline of the area within which said vehicle can be glide landed at any given instant;

and means for graphically displaying said approximation of said outline of said area.

3. Energy management apparatus for presenting the real time in-flight total unpowered range capability of a glider type vehicle comprising:

means for continuously computing the coordinates of a closed curve approximating the outline of the area in which it is possible to glide land said vehicle at a given instant;

and means for graphically displaying said approximation of said outline with reference to a map of said area.

4. Appartus as in claim 3 wherein said closed curve is a predetermined function of a cardioid.

5. Energy management guidance apparatus for presenting the real time in-flight total unpowered range capability of a glider type vehicle comprising:

first means for determining parameters of the total energy of said vehicle at a given instant;

second means for deriving from said parameters information indicative of the area in which it is possible to land said vehicle at any given instant;

and third means utilizing said information for graphically displaying a map of said area.

6. Apparatus as in claim 5 wherein said first means comprises a source of data and a plurality of information transducers for generating from said data signals representative of the total velocity, vertical velocity, horizontal velocity, altitude, heading, and geographical position of said vehicle relative to a fixed ground point.

7. Apparatus as in claim 5 wherein said second means comprises a special purpose analog computer for generating output voltages representing the coordinates of a continuous closed curve which is capable of being represented by an expression empirically known to produce a close approximation to the curve determined by the outline of said area for any set of values of said parameters.

8. Apparatus as in claim 5 wherein said third means comprises an oscilloscope the screen of which has a translucent overlay on which a ground map is portrayed and the deflection channels of which are connected to be activated by signals representative of the information derived by said second means to cause the electron beam of said oscilloscope to continuously trace out an outline indication of said area on said map.

9. A guidance apparatus for a glider type vehicle comprising:

means for generating on a real time basis a first signal proportional to the total in-flight unpowered range capability of said vehicle with respect to a first set of coordinates fixed with respect to said vehicle;

means for transforming said first signal proportional to said range capability with respect to said first set of coordinates to a second signal proportional to said range capability with respect to a second set of coordinates fixed with respect to a predetermined ground point;

and means for displaying said transformed signal graphically with comparison to a ground map including said fixed point.

10. Guidance apparatus for a glider type vehicle comprising:

means for determining the total velocity, the vertical velocity, the horizontal velocity, the altitude, the heading, and the position of said vehicle with respect to a predetermined ground base point;

information translation means for producing compatible signals representative of each of said quantities;

computer means having said signals applied thereto as inputs;

said computer means comprising circuitry for continuously generating output voltages representative of the coordinates of a closed curve approximating the outline of the area in which it is possible to maneuver said vehicle to a landing at any given instant;

oscilloscope display means having a translucent map overlay on the viewing screen thereof, said map including a representation of said fixed ground base point;

and means to apply said output voltages generated by said computer to the deflection circuits of said oscilloscope to cause the beam of said oscilloscope to continuously trace out said approximation of said possible landing area.

11. Guidance apparatus for a glider type vehicle comprising:

means for determining the total velocity, the vertical velocity, the horizontal velocity, the altitude, the heading, and the position of said vehicle with respect to a predetermined ground base point;

information translation means for producing compatible signals representative of each of said quantities;

computer means having said signals applied thereto as inputs;

said computer means comprising circuitry for continuously generating voltages representative of the coordinates of a closed curve approximating with respect to a first set of coordinates fixed with respect to said vehicle the outline of the area in which it is possible to maneuver said vehicle to a landing at any given instant;

means for transforming the representation for said approximation from said first set of coordinates to a second set of coordinates fixed with respect to a predetermined ground point;

and means for graphically displaying said closed curve comprising an oscilloscope the screen of which has a translucent overlay on which a ground map is portrayed and the deflection channels of which are activated by the output signals of said computer to cause the electron beam of said oscilloscope to continuously trace out the modified cardioid with respect to said fixed point on said ground map.

12. Energy management guidance apparatus for presenting the real time in-flight total unpowered range capability of a glider type vehicle comprising:

a source of data concerning the energy state of said vehicle;

a plurality of information tranducers connected to generate from said data signals representative of the total velocity, vertical velocity, horizontal velocity, altitude, heading, and geographical position of said vehicle relative to a fixed ground point;

a special purpose analog computer having said signals connected thereto as inputs, said computer comprising circuitry for generating output voltages representing the coordinates of a continuous closed curve which is capable of being represented by an expression empirically known to produce a close approximation to the curve determined by the outline of the area in which it is possible to land said vehicle at any given instant;

display means comprising an oscilloscope having said computer output voltages applied to the deflection channels thereof to cause the electron beam of said oscilloscope to continuously trace out said closed curve on the screen of said oscilloscope, said screen being provided with a translucent overlay on which a ground map is portrayed in a predetermined relationship to the relative position of said curve.

13. Apparatus as in claim 12 wherein said circuitry of said special purpose computer comprises means for generating a continuous closed curve which is a predetermined function of a cardioid curve and the expression for which is first determined in a set of coordinates fixed with respect to said vehicle and is then transformed to a set of coordinates fixed with respect to the ground and independent of the heading angle of said vehicle.

References Cited by the Examiner

UNITED STATES PATENTS 2,959,779  11/1960  Miller et al. _____ 235—61

MALCOLM A. MORRISON, *Primary Examiner.*

K. W. DOBYNS, *Assistant Examiner.*